(12) United States Patent
Uramichi et al.

(10) Patent No.: US 8,182,039 B2
(45) Date of Patent: May 22, 2012

(54) COUPLING DEVICE OF VEHICLE SEAT

(75) Inventors: Hideki Uramichi, Toyota (JP); Shinji Nonaka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 434 days.

(21) Appl. No.: 12/507,323

(22) Filed: Jul. 22, 2009

(65) Prior Publication Data
US 2010/0026072 A1 Feb. 4, 2010

(30) Foreign Application Priority Data

Aug. 4, 2008 (JP) ................................. 2008-200611

(51) Int. Cl.
*B60N 2/235* (2006.01)
(52) U.S. Cl. .................. 297/367 P; 297/366; 297/367 R
(58) Field of Classification Search ............... 297/354.1, 297/354.11, 366, 367 R, 367 P
See application file for complete search history.

(56) References Cited

U.S. PATENT DOCUMENTS

| | | | |
|---|---|---|---|
| 6,733,077 B2 * | 5/2004 | Asano | 297/367 R |
| 6,749,263 B2 * | 6/2004 | Peters | 297/367 R |
| 6,820,937 B1 * | 11/2004 | Esaki et al. | 297/366 |
| 6,824,216 B2 * | 11/2004 | Uramichi | 297/366 |
| 6,910,737 B2 * | 6/2005 | Hosokawa | 297/362 |
| 7,195,318 B2 * | 3/2007 | Cha et al. | 297/367 R |
| 2002/0070596 A1 * | 6/2002 | Nonomiya et al. | 297/367 |
| 2007/0108825 A1 * | 5/2007 | Yamada et al. | 297/367 |
| 2009/0134682 A1 | 5/2009 | Andou et al. | |

FOREIGN PATENT DOCUMENTS

JP 10-57175 3/1998

OTHER PUBLICATIONS

English language Abstract of JP 10-57175, Mar. 3, 1998.

* cited by examiner

*Primary Examiner* — David Dunn
*Assistant Examiner* — Philip Gabler
(74) *Attorney, Agent, or Firm* — Greenblum & Bernstein P.L.C.

(57) ABSTRACT

A coupling device of a vehicle seat includes disc-shaped first and second coupling members; at least two lock member; and guide portions that guide the lock members. The guide portions are disposed on sides of each lock member. When the lock members are pushed outwardly in the radial direction so that external teeth of each lock member are engaged with internal of the second coupling member, the lock member is inclined with respect to the corresponding guide portions, and a portion of each side surface of the lock member contacts the side surface of the corresponding guide portion. At this time, one of the lock members is rotated in a rotational direction opposite to a rotational direction in which the other lock member is rotated.

5 Claims, 13 Drawing Sheets

COUPLING DEVICE OF VEHICLE SEAT

INCORPORATION BY REFERENCE

The disclosure of Japanese Patent Application No. 2008-200611 filed on Aug. 4, 2008 including the specification, drawings and abstract is incorporated herein by reference in its entirety.

BACKGROUND OF THE INVENTION

1. Field of the Invention

The invention relates to a coupling device of a vehicle seat. More specifically, the invention relates to a coupling device of a vehicle seat, which couples two subject members in a manner such that one of the two subject members is rotated relative to the other of the two subject members.

2. Description of the Related Art

Japanese Patent Application Publication No. 10-57175 (JP-A-10-57175) describes a vehicle seat in which a seat back is coupled to a seat cushion through a reclining device, and a tilt angle of the seat back is adjustable. In the publication, the reclining device is configured by combining a movable member with a fixed member in a manner such that the movable member and the fixed member are rotated relative to each other. The movable member is integrally coupled to a framework portion of the seat back. The fixed member is integrally coupled to a framework portion of the seat cushion.

A lock member is provided between the movable member and the fixed member. When the lock member is engaged with the movable member, the lock member locks the relative rotation of the movable member and the fixed member. More specifically, the lock member is guided in a manner such that the lock member is moved only in a radial direction of the fixed member. When external teeth formed in an outer peripheral surface of the lock member is engaged with internal teeth formed in an inner peripheral surface of the movable member, the relative rotation of the movable member and the fixed member is locked.

The above-described lock member is guided in a manner such that the lock member is moved only in the radial direction of the fixed member, by wall portions that are formed in the fixed member, and disposed on sides of the lock member. In the reclining device described in the publication No. 10-57175, when the lock member is engaged with the movable member to lock the lock member, the lock member is rotated so that portions of the lock member, which are located at diagonal positions, contact the respective wall portions, that is, the lock member is in point contact with the wall portions, to prevent the lock member from vibrating in a circumferential direction due to a gap between the lock member and each wall portion. Thus, although the lock member is easily placed with the certain gap between the lock member and each wall portion, it is possible to prevent the lock member from vibrating when the lock member is locked.

In the technology described in the publication, the lock member is supported in a manner such that the lock member is inclined with respect to the wall portions. Therefore, although a supporting force for supporting the lock member in one rotational direction is strong, a supporting force for supporting the lock member in the other rotational direction is weak.

SUMMARY OF THE INVENTION

The invention provides a coupling device of a vehicle seat, which couples two subject members in a manner such that one of the two subject members is rotated relative to the other of the two subject members, wherein a lock member, which locks the coupling device, is easily placed, and the lock member is prevented from vibrating when the coupling device is locked.

A first aspect of the invention relates to a coupling device of a vehicle seat, which couples two subject members in a manner such that one of the two subject members is rotated relative to the other of the two subject members, and relative rotation of the two subject members is locked at a given position. The coupling device includes a first coupling member and a second coupling member, each of which includes a disc portion, wherein the first coupling member and the second coupling member are integrally coupled to the respective subject members, and the first coupling member is combined with the second coupling member in a manner such that the first coupling member and the second coupling member are rotated relative to each other, and the disc portions of the first coupling member and the second coupling member face each other; at least two lock members disposed between the first coupling member and the second coupling member, wherein, when outer peripheral tooth surfaces formed in the lock members are engaged with respective inner peripheral tooth surfaces formed in the second coupling member, relative rotation of the first coupling member and the second coupling member is locked; and a plurality of pairs of guide portions formed in the first coupling member, wherein side surfaces of each pair of guide portions are disposed on sides of the corresponding lock member in a circumferential direction. Each of the lock members is placed in the first coupling member so that a gap is formed between the lock member and each of the corresponding pair of the guide portions disposed on the sides of the lock member. When the outer peripheral tooth surface of each of the lock members is engaged with the corresponding inner peripheral tooth surface of the second coupling member, the lock member is rotated so that the lock member is inclined with respect to the side surfaces of the corresponding pair of the guide portions, and a portion of each of both side surfaces of the lock member contacts the side surface of the corresponding guide portion. The lock members are arranged in the circumferential direction in the first coupling member, and at least one of the lock members is rotated in a rotational direction opposite to a direction in which at least one of the other lock members is rotated, to contact the side surfaces of the corresponding pair of the guide portions.

At this time, each lock member is rotated, and supported in a manner such that the lock member is inclined with respect to the side surfaces of the corresponding pair of the guide portions. Thus, although a supporting force in one circumferential direction is strong, a supporting force in the other circumferential direction is weak. However, because at least one of the lock members is rotated in the rotational direction opposite to the rotational direction in which at least one of the other lock members is rotated, to contact the side surfaces of the corresponding pair of the guide portions, the supporting force in the clockwise direction and the supporting force in the counterclockwise direction are reliably provided. Thus, although each lock member is easily placed with a gap between the lock member and each of the side surfaces of the corresponding pair of the guide portions, the lock member contacts the side surfaces of the corresponding pair of the guide portions in the circumferential direction, and thus, the lock member is prevented from vibrating when the coupling device is lock.

The coupling device according to the first aspect of the invention may further include a slide cam disposed between the two lock members. The two lock members may be symmetric to each other with respect to a line orthogonal to a rotational axis of the coupling device. When the slide cam slides in one direction along the line, the two lock members may be guided by respective inclination surfaces formed in the slide cam so that the two lock members are rotated in the rotational directions opposite to each other while the two lock members are pushed outwardly in the radial direction of the first coupling member.

Thus, the lock members are rotated in the rotational directions opposite to each other in a relatively simple configuration. Also, the lock members, which are pushed outwardly in the radial direction by the slide cam, are supported by the slide cam from the inside in the radial direction.

In the first aspect of the invention, the side surfaces of each pair of the guide portions may extend straight in parallel with each other. The side surfaces of each of the lock members may be inclined with respect to the side surfaces of the corresponding pair of the guide portions, and extend in parallel with each other, when the outer peripheral tooth surfaces formed in the lock members are engaged with the respective inner peripheral tooth surfaces of the second coupling member. When each of the lock members is oriented so that the side surfaces of the lock member extend in parallel with the side surfaces of the corresponding pair of the guide portions, a gap may be formed between the lock member and each of the side surfaces of the corresponding pair of the guide portions in the circumferential direction.

In the above-described aspect, the side surfaces of each pair of the guide portions may extend in substantially parallel with the radial direction of the first coupling member.

With the above-described configuration, when the outer peripheral tooth surface is engaged with the corresponding inner peripheral tooth surface, the side surfaces of each lock member are inclined with respect to the direction in which the outer peripheral tooth surface is engaged with the corresponding inner peripheral tooth surface. Therefore, the outer peripheral tooth surface faces outwardly in the radial direction when each lock member is rotated, and contacts the side surfaces of the corresponding pair of the guide portions. Thus, it is possible to make a peripheral length of the outer peripheral tooth surface long.

In the above-described aspect, the side surfaces of each of the lock members may extend in substantially parallel with the radial direction of the first coupling member when the outer peripheral tooth surfaces formed in the lock members are engaged with the respective inner peripheral tooth surfaces of the second coupling member.

With the above-described configuration, the side surfaces of each pair of the guide portions are inclined with respect to the direction in which the outer peripheral tooth surface is engaged with the corresponding inner peripheral tooth surface. Accordingly, when each lock member is rotated, and contacts the surfaces of the corresponding pair of the guide portions, the side surfaces of the lock member extend straight in parallel with the direction in which the outer peripheral tooth surface is engaged with the corresponding inner peripheral tooth surface, and the outer peripheral tooth surface is oriented to engage with the corresponding inner peripheral tooth surface.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 12 is a sectional view showing a configuration of a reclining device according to a second embodiment of the invention, which is seen in the same direction as the direction in which FIG. 6 is seen;

DETAILED DESCRIPTION OF EMBODIMENTS

Figure 1:
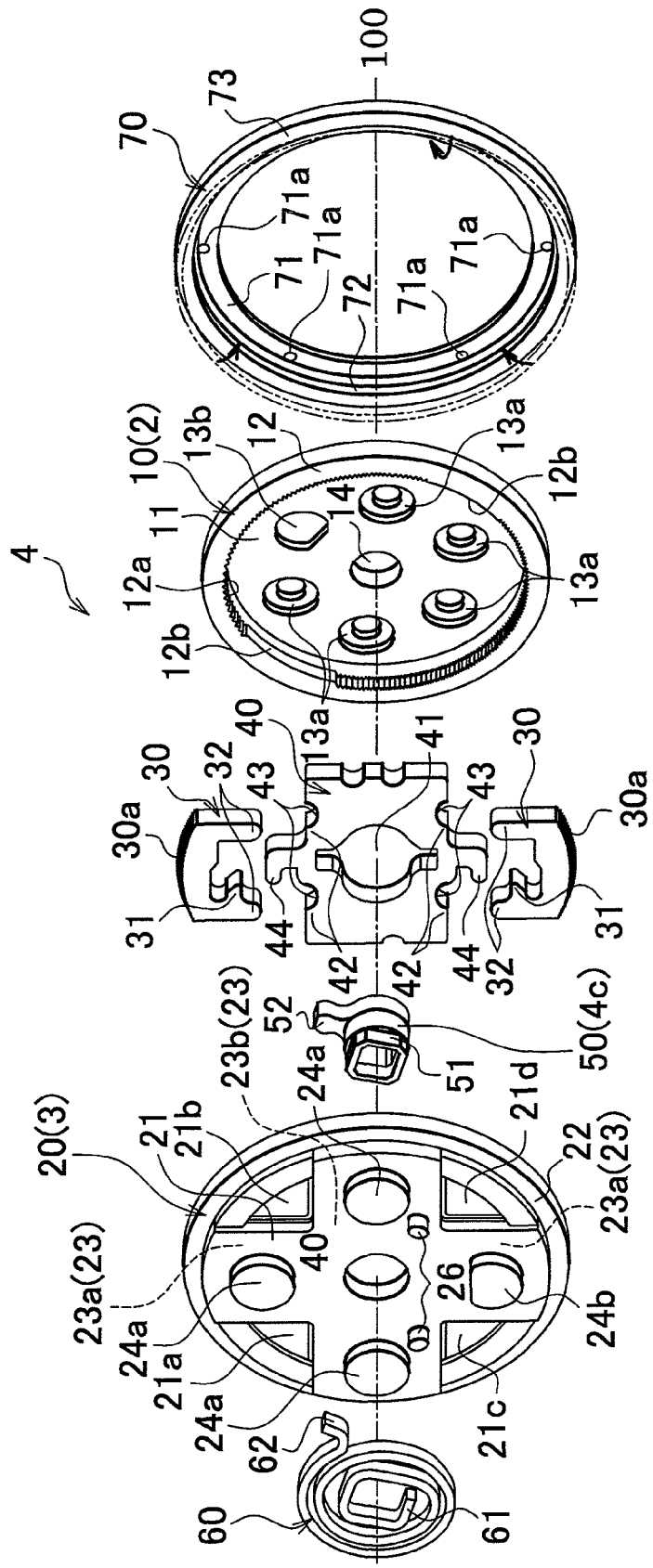
FIG. 1 is an exploded perspective view showing a reclining device according to a first embodiment of the invention.

Hereinafter, embodiments of the invention will be described with reference to the drawings.

First, a configuration of a coupling device of a vehicle seat according to a first embodiment of the invention will be described with reference to FIG. 1 to FIG. 11. FIG. 2 schematically shows a configuration of a vehicle seat 1 according to the first embodiment. In the vehicle seat 1, a seat back 2 is coupled to a seat cushion 3 through a pair of right and left reclining devices 4. The right and left reclining devices 4 are disposed in side portions of the vehicle seat 1 at lower positions. The reclining devices 4 function as the coupling device of a vehicle seat according to the invention.

Operation shafts 4c, which switch the state of the reclining devices 4 between a lock state and an unlock state, are integrally coupled to each other by a connecting rod 4r. Thus, the both reclining devices 4 are simultaneously switched between the lock state and the unlock state. When the reclining devices 4 are in the lock state, a tilt angle of the seat back 2 is fixed. When the reclining devices 4 are in the unlock state, the tilt angle of the seat back 2 is unfixed to allow adjustment of the tilt angle. The reclining devices 4 are normally maintained in the lock state due to urging force.

When an operating lever 5, which is provided in a side portion of the seat cushion 3, is pulled up, the reclining devices 4 are simultaneously placed in the unlock state. As a result, the tilt angle of the seat back 2 is unfixed to allow adjustment of the tilt angle. When the unlocking operation is stopped, that is, the pulling-up of the operating lever 5 is stopped after the tilt angle of the seat back 2 is adjusted, the reclining devices 4 are returned to the lock state due to the urging force, and therefore, the tilt angle of the seat back 2 is fixed at the adjusted angle.

The seat back 2 is normally urged in such a rotational direction that the seat back 2 is tilted forward, by the urging force of an urging spring fitted to the seat back 2 and the seat cushion 3. Accordingly, when the reclining devices 4 are placed in the unlock state while an occupant is not seated on the vehicle seat 1, the seat back 2 is tilted forward due to the urging force, and then, the seat back 2 is laid on an upper surface portion of the seat cushion 3.

When the rotational angle of the reclining devices 4 is in a rotational angle zone in which the seat back 2 is used as the backrest, the reclining devices 4 are generally returned to the lock state due to the urging force, by stopping the unlocking operation. However, the rotational angle zone of the reclining devices 4 includes a lock zone and a free zone. When the rotational angle of the reclining devices 4 is in the lock zone, the reclining devices 4 are returned to the lock state due to the urging force, by stopping the unlocking operation. When the rotational angle of the reclining devices 4 is in the free zone, the reclining devices 4 are not returned to the lock state even if the unlocking operation is stopped.

The lock zone is generally set to the rotational angle zone in which the seat back 2 is used as the backrest. More specifically, the lock zone is generally set to the rotational angle zone from an angle position at which the seat back 2 stands upright, to an angle position at which the seat back 2 is tilted rearward as much as possible. The free zone is set to a rotational angle zone in which the seat back 2 is tilted forward, and is not used as the backrest. More specifically, the free zone is set to the rotational angle zone from the angle position at which the seat back 2 stands upright to an angle position at which the seat back 2 is tilted forward as much as possible.

Accordingly, in the case where the seat back 2 needs to be tilted forward, even if the unlocking operation is stopped after the reclining devices 4 are placed in the unlock state and the seat back 2 is slightly tilted forward from the upright position, the seat back 2 is further tilted forward without the need of pressing the seat back 2 forward, and laid on the upper surface portion of the seat cushion 3. Hereinafter, the configuration of the above-described reclining devices 4 will be described in detail. Although the reclining devices 4 are symmetric to each other, the reclining devices 4 have substantially the same configuration. Accordingly, hereinafter, only the configuration of the reclining device 4 in a right side of FIG. 2 will be described.

Figure 2:
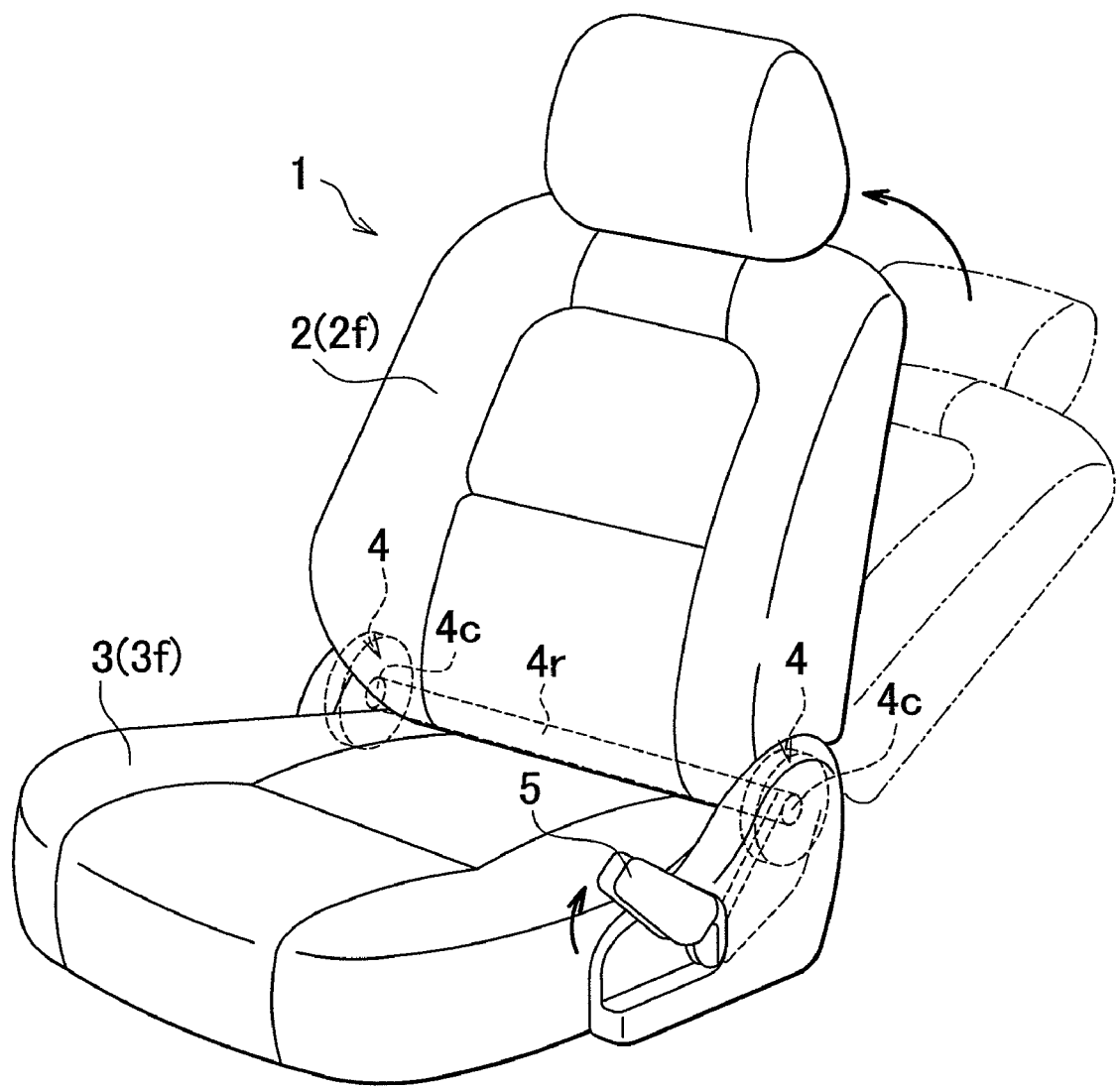
FIG. 2 is a perspective view schematically showing a configuration of a vehicle seat.

As shown in FIG. 1, the reclining device 4 is configured by combining a disc-shaped ratchet 10, a disc-shaped guide 20, a pair of an upper engagement piece 30 and a lower engagement piece 30, a slide cam 40, a hinge cam 50, an urging spring 60, and a holding member 70. The upper and lower engagement pieces 30 are disposed between disc-shaped surfaces of the ratchet 10 and the guide 20. The hinge cam 50 slides the slide cam 40. The urging spring 60 urges the hinge cam 50 in a rotational direction. The holding member 70 keeps the ratchet 10 inserted in the guide 20 in a plate-thickness direction (i.e., in an axial direction). The guide 20 functions as the first coupling member according to the invention. The ratchet 10 functions as the second coupling member according to the invention. The engagement pieces 30 functions as the lock members according to the invention.

More specifically, in the ratchet 10, a cylindrical portion 12 protrudes from an outer peripheral edge of a disc portion 11 in the plate-thickness direction. The cylindrical portion 12 is formed by performing a half-blanking process on the outer peripheral edge of the disc portion 11 in the plate-thickness direction. In an inner peripheral surface of the cylindrical portion 12, inner peripheral tooth surfaces 12a and raised portions 12b are alternately arranged. Internal teeth are formed on each inner peripheral tooth surface 12a. No internal tooth is formed on each raised portion 12b. The raised portions 12b are formed on the inner peripheral surface of the cylindrical portion 12 at two positions that are symmetric about a rotational axis 100 of the reclining device 4. Each raised portion 12b is a curved surface that protrudes inwardly in a radial direction with respect to the inner peripheral tooth surface 12a. Each raised portion 12 is flat in the plate-thickness direction.

Figure 6:
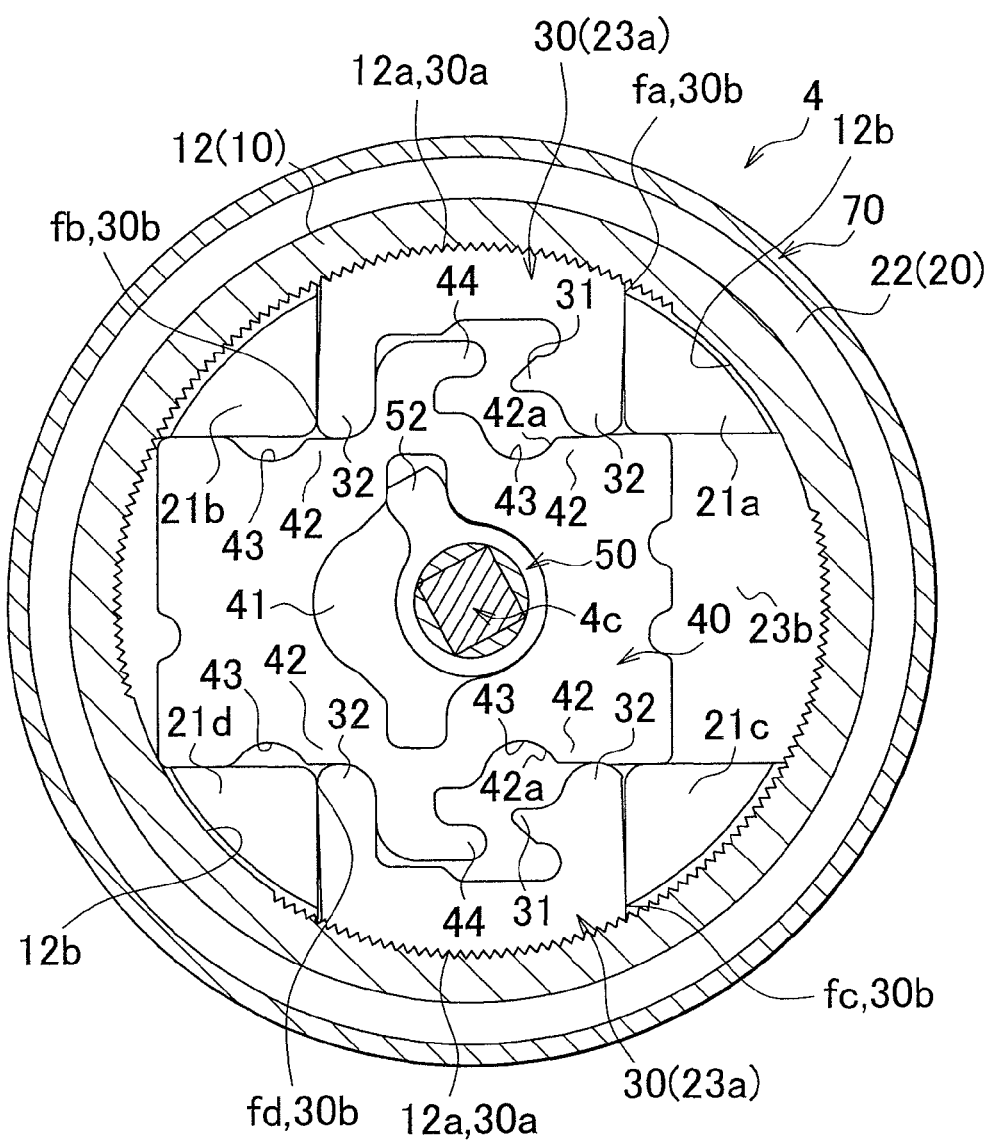
FIG. 6 is a sectional view showing the reclining device that is in the lock state, which is taken along line VI-VI in FIG. 3.

As shown in FIG. 6, when the raised portions 12b do not interfere with the engagement pieces 30, the engagement pieces 30 move outwardly in the radial direction and are permitted to engage with the respective inner tooth surfaces 12a of the ratchet 10. Accordingly, the lock zone in which the engagement pieces 30 are permitted to engage with the respective inner peripheral tooth surfaces 12a of the ratchet 10 is set to the rotational angle zone in the circumferential direction, in which the raised portions 12b do not interfere with the engagement pieces 30.

However, when the raised portions 12b interfere with the engagement pieces 30, at least portions of the engagement pieces 30 are placed on the raised portions 12b, and therefore, the engagement pieces 30 are prevented from engaging the inner peripheral tooth surfaces 12a of the ratchet 10, that is, the locking operation is prevented. Accordingly, the free zone in which the engagement pieces 30 are prevented from engaging with the inner peripheral tooth surface 12a of the ratchet 10 is set to the rotational angel zone in the circumferential direction, in which the raised portions 12b interfere with the engagement pieces 30.

Figure 3:
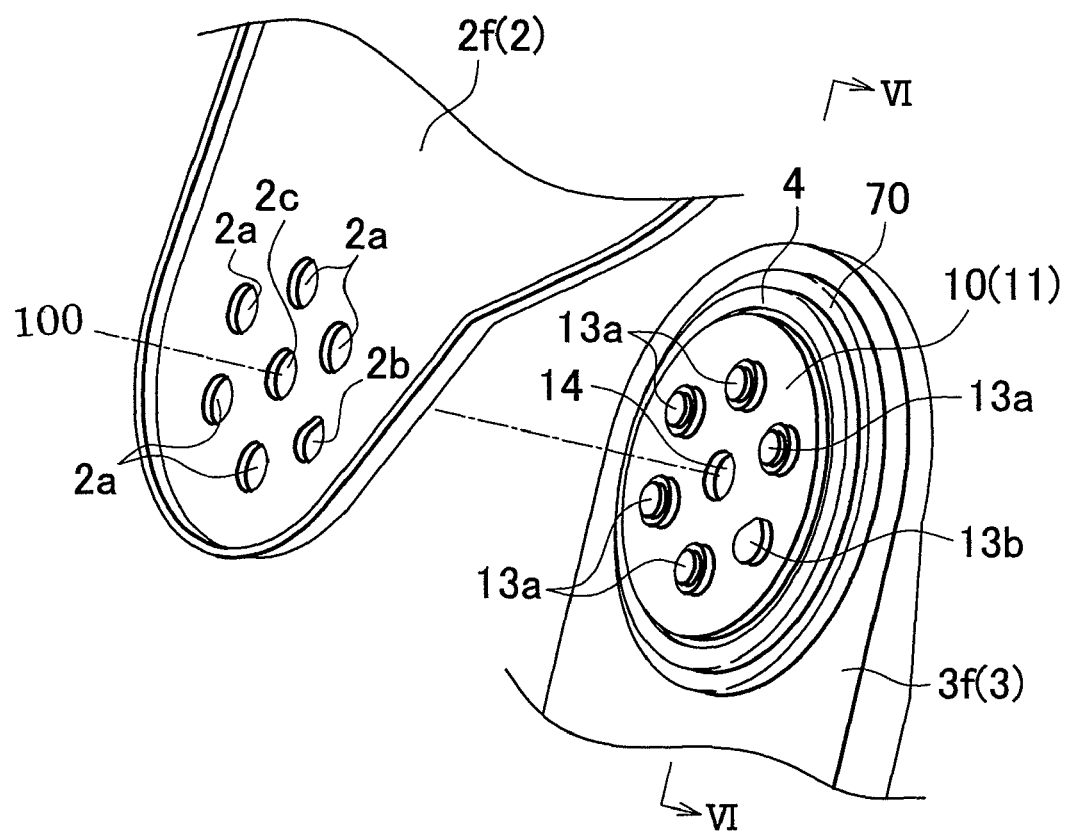
FIG. 3 is a perspective view showing a manner in which the reclining device is assembled.

As shown in FIG. 3, the ratchet 10 is integrally coupled to the seat back 2 by joining an outer surface of the disc portion 11 to a plate surface of a back frame 2f that constitutes a framework of the seat back 2. The back frame 2f functions as one of the two subject members.

A plurality of protrusions 13a and a D-shaped protrusion 13b are formed in the disc portion 11 of the ratchet 10. The cylindrical protrusions 13a and the D-shaped protrusion 13b protrude from the outer surface of the disc portion 11 of the ratchet 10. The protrusions 13a and the D-shaped protrusion 13b are disposed close to the outer peripheral edge of the disc portion 11, and arranged at equal intervals in the circumferential direction. The D-shaped protrusion 13b is formed by cutting out a portion of the cylindrical protrusion, and thus, the D-shaped protrusion 13b has a D-shape cross section. Accordingly, the D-shaped protrusion 13b is distinguished from the cylindrical protrusions 13a.

A plurality of holes 2a and a D-shaped hole 2b are formed in the back frame 2f to extend through the back frame 2f so that the protrusions 13a are fitted into the holes 2a and the D-shaped protrusion 13b is fitted into the D-shaped hole 2b. Thus, the ratchet 10 is strongly and integrally coupled to the back frame 2f by fitting the protrusions 13a and the D-shaped protrusion 13b into the holes 2a and the D-shaped hole 2b formed in the back frame 2f, and joining fitting portions of the protrusions 13a and 13b to edges of the holes 2a and 2b by welding (refer to FIG. 5).

A through-hole 14 is formed at a center of the disc portion 11 of the ratchet 10. The above-described operating shaft 4c (refer to FIG. 2), which switches the state of the reclining device 4 between the lock state and the unlock state, is inserted through the through-hole 14. In the back frame 2f, a through-hole 2c is formed coaxially with the through-hole 14 so that the operating shaft 4c is inserted through the through-hole 2c.

Figure 5:
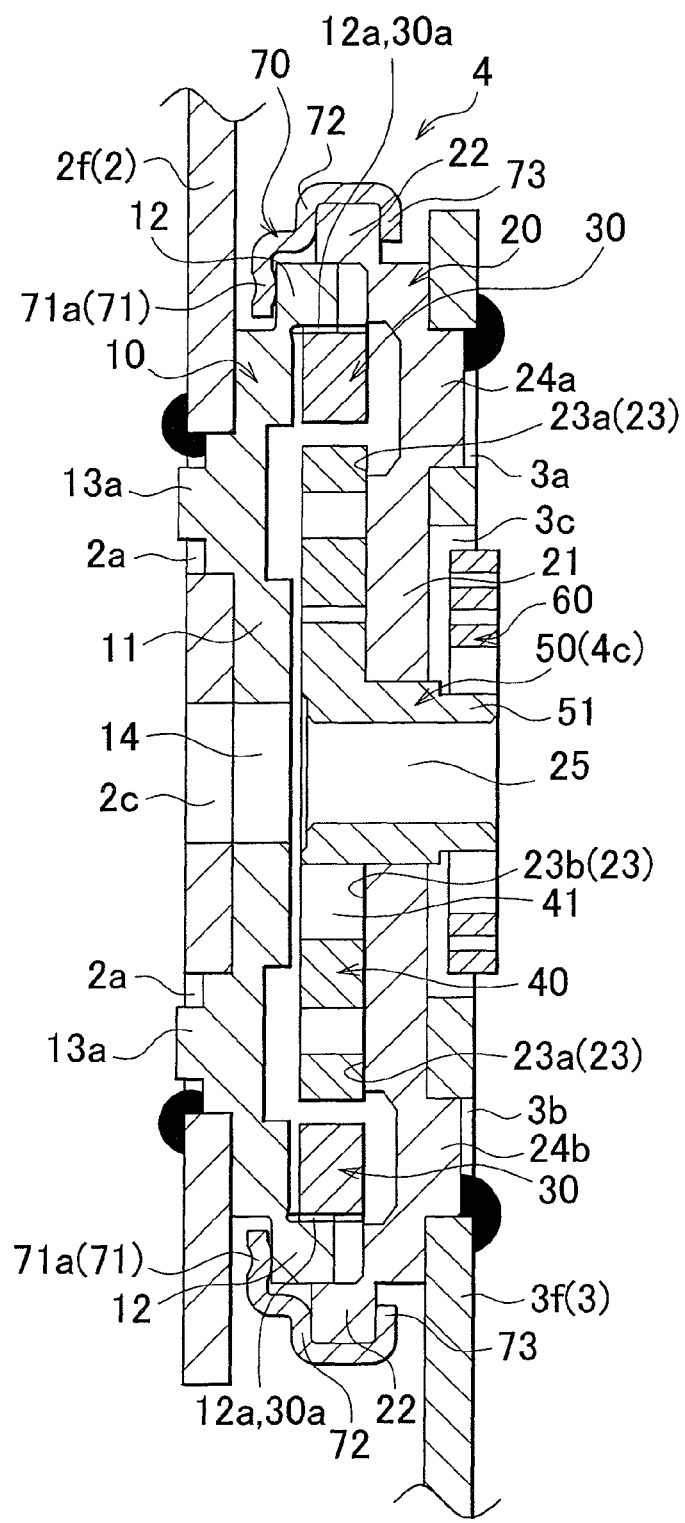
FIG. 5 is a sectional view taken along line V-V in FIG. 4.

Next, referring again to FIG. 1, a configuration of the guide 20 will be described. The guide 20 with a disc shape has an outer diameter larger than an outer diameter of the ratchet 10. A cylindrical portion 22 is formed at an outer peripheral edge of a disc portion 21 of the guide 20. The cylindrical portion 22 protrudes toward the ratchet 10. The cylindrical portion 22 is formed by performing a half-blanking process on the outer peripheral edge of the disc portion 21 in the plate-thickness direction. As shown in FIG. 5, the cylindrical portion 22 has such a size that the cylindrical portion 22 surrounds the outer periphery of the cylindrical portion 12 of the ratchet 10.

Figure 4:
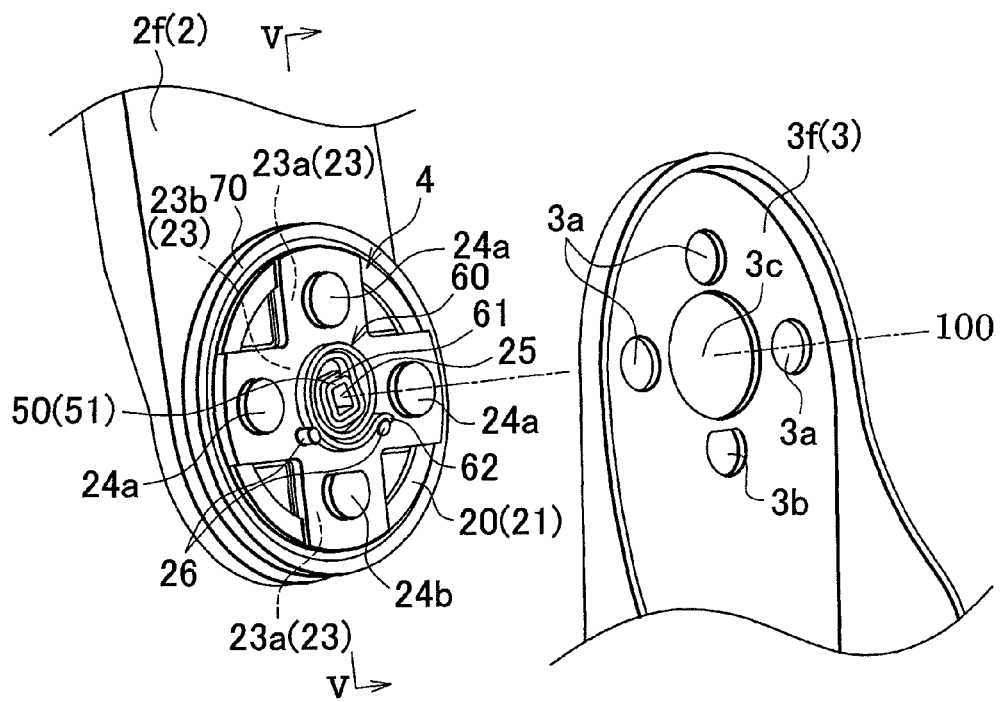
FIG. 4 is a perspective view showing a manner in which the reclining device is assembled.

When the cylindrical portion 12 of the ratchet 10 is inserted in the cylindrical portion 22, that is, when the guide 20 with the cylindrical shape and the ratchet 10 with the cylindrical shape are fitted to each other, the guide 20 and the ratchet 10 are able to slide relative to each other, and thus, the guide 20 and the ratchet 10 are able to rotate relative to each other. As shown in FIG. 4, the guide 20 is integrally coupled to the seat cushion 3 by joining an outer surface of the disc portion 21 to a plate surface of a cushion frame 3f that constitutes a framework of the seat cushion 3. The cushion frame 3f functions as the other of the two subject members.

A plurality of protrusions 24a and a D-shaped protrusion 24b are formed in the disc portion 21 of the guide 20. The cylindrical protrusions 24a and the D-shaped protrusion 24b protrude from the outer surface of the disc portion 21 of the guide 20. The protrusions 24a and the D-shaped protrusion 24b are disposed close to the outer peripheral edge of the disc portion 21, and arranged at equal intervals in the circumferential direction. The D-shaped protrusion 24b is formed by cutting out a portion of the cylindrical protrusion, and thus, the D-shaped protrusion 24b has a D-shape cross section. Accordingly, the D-shaped protrusion 24b is distinguished from the cylindrical protrusions 24a.

A plurality of holes 3a and a D-shaped hole 3b are formed in the cushion frame 3f to extend through the cushion frame 3f so that the protrusions 24a are fitted into the holes 3a and the D-shaped protrusion 24b is fitted into the D-shaped hole 3b. Thus, the guide 20 is strongly and integrally coupled to the cushion frame 3f by fitting the protrusions 24a and the D-shaped protrusion 24b into the holes 3a and the D-shaped hole 3b formed in the cushion frame 3f, and joining fitting portions of the protrusions 24a and 24b to edges of the holes 3a and 3b by welding (refer to FIG. 5).

A through-hole 25 is formed at a center of the disc portion 21 of the guide 20. The above-described operating shaft 4c (refer to FIG. 2), which switches the state of the reclining device 4 between the lock state and the unlock state, is inserted through the through-hole 25. In the cushion frame 3f, a through-hole 3c is formed coaxially with the through-hole 25 so that the operating shaft 4c is inserted through the through-hole 3c. The through-hole 3c has such a size that an urging spring 60 (described later) is housed in the through-hole 3c.

Referring again to FIG. 1, a guide groove 23 is formed in the inner surface of the disc portion 21 of the guide 20. The guide groove 23 is formed in a shape of a plus sign, and is recessed in the plate-thickness direction. The guide groove 23 in the shape of the plus sign is formed by performing a half-blanking process on the disc portion 21 in the plate-thickness direction. The above-described protrusions 24a and the D-shaped protrusion 24b are formed on the outer surface of the disc portion 21 at positions at which portions of the guide groove 23 are formed on the inner surface of the disc portion 21. The upper groove portion of the guide groove 23 and the lower groove portion of the guide groove 23 in FIG. 1 are engagement-piece grooves 23a in which the engagement pieces 30 (described later) are housed.

Figure 7:
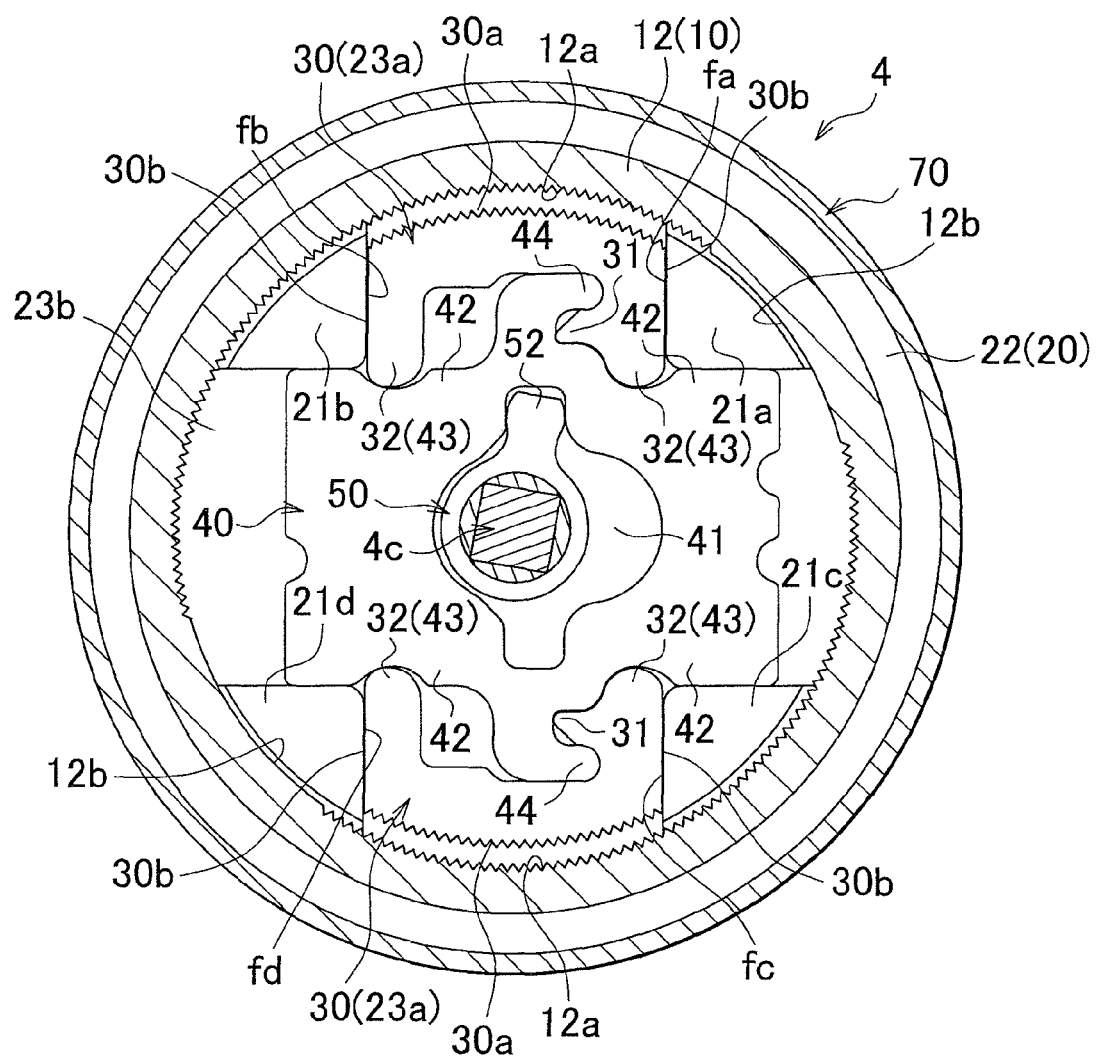
FIG. 7 is a sectional view showing the reclining device that is brought from the state shown in FIG. 6 to a unlock state.

As shown in FIG. 7, the engagement-piece grooves 23a guide the engagement pieces 30 so that the engagement pieces 30 slide only in the radial direction of the guide 20 (that is, the engagement pieces 30 slide only upward and downward in FIG. 7) along the shape of the engagement-piece grooves 23a due to the shapes of guide walls 21a and 21b and guide walls 21c and 21d. The guide walls 21a and 21b are side walls disposed on sides of the engagement-piece groove 23a in a lateral direction. The guide walls 21c and 21d are side walls disposed on sides of the other engagement piece groove 23a in the lateral direction. The right groove portion and the left groove portion of the guide groove 23 in FIG. 7, which extend in the lateral direction, and a groove portion between the right and left groove portions are continuous with each other, and consist a slide-cam groove 23b in which the slide cam 40 (described later) is housed.

The slide-cam groove 23b guides the slide cam 40 so that the slide cam 40 slides only in the radial direction of the guide 20 (that is, the slide cam 40 slides only toward the right side and left side in FIG. 7) along the shape of the slide-cam groove 23b due to the shapes of the guide walls 21a and 21c and the guide walls 21b and 21d. The guide walls 21a and 21c are the side walls disposed on sides of the slide-cam groove 23b in an upward-downward direction. The guide walls 21b and 21d are the side walls disposed on sides of the slide-cam groove 23b in the upward-downward direction. Referring again to FIG. 1, spring fitting portions 26 protrude from the outer surface of the disc portion 21 of the guide 20. Each spring fitting portion 26 has a pin shape. The spring fitting portions 26 are functional components to which an outer end 62 of the urging spring 60 (coil spring) (described later) is fitted. The spring fitting portions 26 are formed at two locations so that the location, at which the outer end 62 of the urging spring 60 is positioned, can be selected between the two locations.

Next, configurations of the engagement pieces 30 will be described. The engagement pieces 30 are slidably housed in the respective engagement-piece grooves 23a formed in the guide 20 as described above. Each engagement piece 30 includes a hook-shaped portion. The upper engagement piece 30 and the lower engagement piece 30 are symmetric to each other. More specifically, an outer peripheral edge of each engagement piece 30 is in an arc shape so that the outer peripheral edge of each engagement piece 30 matches an inner peripheral surface of the cylindrical portion 12 of the ratchet 10. An outer peripheral tooth surface 30a, which engages with the inner peripheral tooth surface 12a, is formed on the outer peripheral surface of each engagement piece 30, which is in the arc shape.

Accordingly, as shown in FIG. 6, when the engagement pieces 30 are pressed by the slide cam 40 (described later) and slid outwardly in the radial direction, the outer peripheral tooth surfaces 30a are engaged with the inner peripheral tooth surfaces 12a of the ratchet 10. As a result, the engagement pieces 30 are engaged with the ratchet 10, and thus, the engagement pieces 30 and the ratchet 10 are integrated with each other. The engagement pieces 30 are guided by the guide walls 21a and 21b and the guide walls 21c and 21d formed in the guide 20 in a manner such that the engagement pieces 30 slide only in the radial direction.

Accordingly, the ratchet 10 is restricted from rotating relative to the guide 20 by the engagement pieces 30. As a result, the rotation of the reclining device 4 is locked, that is, the reclining device 4 is placed in the lock state. As shown in FIG. 7, when the engagement pieces 30 are pulled inwardly in the radial direction, and the engagement pieces 30 are disengaged from the ratchet 10, the reclining device 4 is placed in the unlock state.

The engagement pieces 30 are pushed outwardly and pulled inwardly in the radial direction by sliding the slide cam 40 disposed between the engagement pieces 30. As shown in FIG. 1, the slide cam 40 is slidably housed in the above-described slide-cam groove 23b formed in the guide 20. The slide cam 40 includes hook-shaped portions. An upper portion and a lower portion of the slide cam 40 are symmetric to each other. Shoulder portions 42 and a hook 44 are formed in each of an upper edge and a lower edge of the slide cam 40 in FIG. 1. The shoulder portions 42 push the engagement pieces 30 outwardly in the radial direction, and the hooks 44 pull the engagement pieces 30 inwardly in the radial direction.

An inner portion of each engagement piece 30 in the radial direction is partially recessed, and thus, each engagement piece 30 has an arch shape. When leg portions 32 of the arch-shaped engagement pieces 30 contact an upper edge surface and a lower edge surface of the slide cam 40, the engagement pieces 30 are pressed outwardly in the radial direction by the slide cam 40. More specifically, as shown in FIG. 6, when the slide cam 40 slides toward the left side in FIG. 6, the leg portions 32 are placed on the respective shoulder portions 42 of the slide cam 40. As a result, the engagement pieces 30 are kept pushed outwardly in the radial direction.

Accordingly, the engagement pieces 30 are normally supported from the inside in the radial direction by the respective shoulder portions 42 of the slide cam 40. Thus, the outer peripheral tooth surfaces 30a of the engagement pieces 30 are kept pressed to, and engaged with the respective inner peripheral tooth surfaces 12a of the ratchet 10. As shown in FIG. 7, when the slide cam 40 is slid toward the right side in FIG. 7, hook portions 31 formed in inner peripheral portions of the engagement pieces 30 are hooked by the respective hooks 44 of the slide cam 40, and pulled inwardly in the radial direction.

Figure 8:
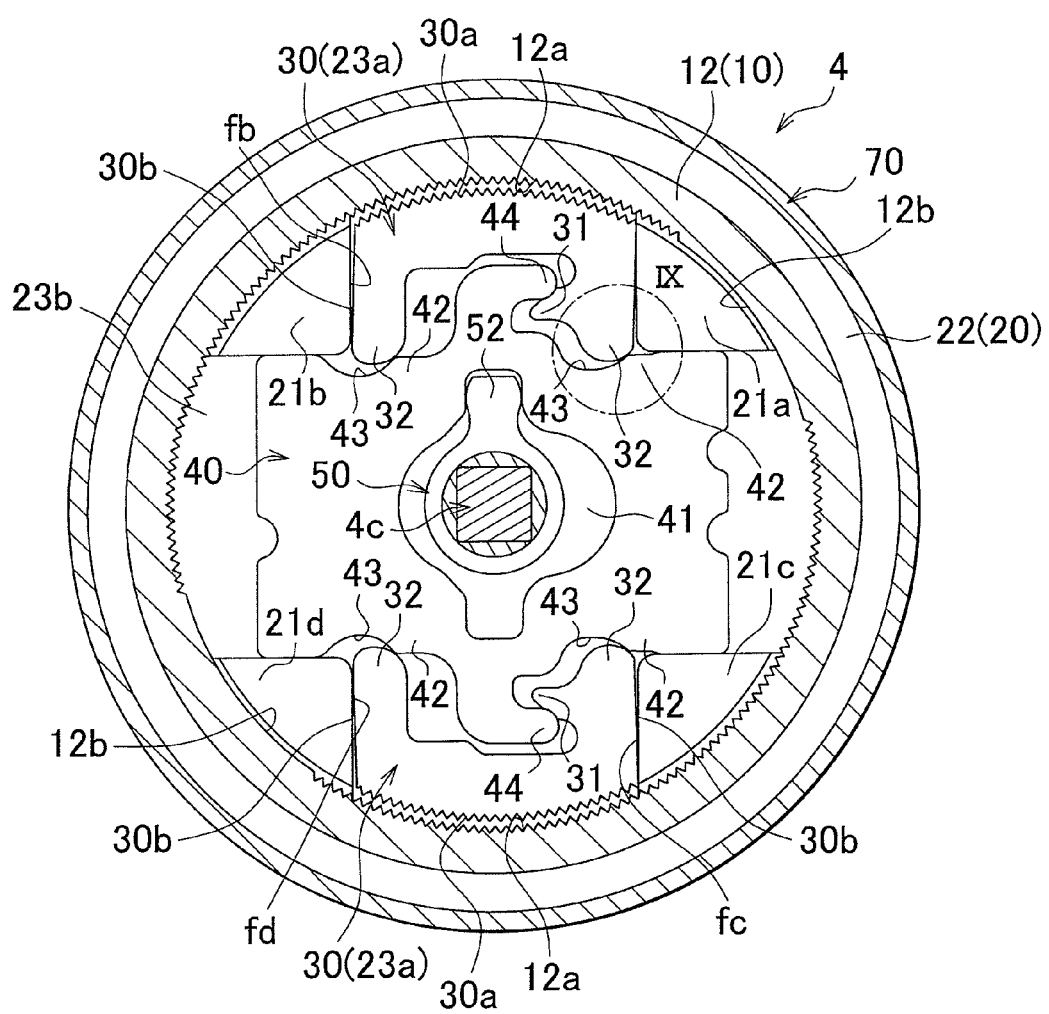
FIG. 8 is a configuration diagram showing the reclining device in which engagement pieces are pushed outwardly in a radial direction by a slide cam.

Thus, the leg portions 32 of the engagement pieces 30, which have been placed on the respective shoulders 42 of the slide cam 40 as shown in FIG. 6, move into respective groove portions 43 formed on the left side of the respective shoulders 42. As a result, the outer peripheral tooth surfaces 30a of the engagement pieces 30 are disengaged from the respective inner peripheral tooth surfaces 12a (as shown in FIG. 7). Each groove portion 43 is inclined from an end of the corresponding shoulder portion 42, and smoothly recessed. As shown in FIG. 8, when the slide cam 40 slides toward the left side, the leg portions 32 of the engagement pieces 30 are pushed outwardly in the radial direction along the inclined shape of the respective shoulder portions 42, and thus, the leg portions 32 are placed on the respective shoulder portions 42.

The slide cam 40 is slid toward the right side and left side in FIG. 6 to FIG. 8 by rotating the hinge cam 50 fitted in a cam hole 41. The cam hole 41 is formed at a center portion of the slide cam 40 to extend through the slide cam 40. As shown in FIG. 1, the hinge cam 50 is rotatably fitted in the cam hole 41. The hinge cam 50 is normally urged in a clockwise direction in FIG. 1 by the urging force of the urging spring 60 (coil spring) fitted to the guide 20 and the hinge cam 50.

As shown in FIG. 4, the urging spring 60 is twisted in advance, and an inner end 61 of the urging spring 60 is fitted to a spring fitting portion 51 of the hinge cam 50, and the outer end 62 of the urging spring 60 is fitted to the spring fitting portion 26 of the guide 20. Accordingly, as shown in FIG. 6, an operating projection 52 formed in an outer peripheral portion of the hinge cam 50 normally presses the slide cam 40 from the inner peripheral surface of the cam hole 41 to slide the slide cam 40 toward the left side in FIG. 6.

By sliding the slide cam 40 in the above-described manner, the engagement pieces 30 are pushed outwardly in the radial direction, and the leg portions 32 are placed on the respective shoulder portions 42 of the slide cam 40. As a result, the engagement pieces 30 are kept engaged with the ratchet 10. The hinge cam 50 is integrally coupled to the operating shaft 4c described with reference to FIG. 2, in a manner such that the hinge cam 50 is rotated integrally with the operating shaft 4c. Thus, when the operating lever 5 (refer to FIG. 2) is pulled up, the hinge cam 50 is rotated in a rotational direction against the urging force of the urging spring 60 described with reference to FIG. 1.

That is, the hinge cam 50 is rotated in the clockwise direction in FIG. 6 by the operating shaft 4c. Accordingly, as shown in FIG. 7, the slide cam 40 is slid toward the right side in FIG. 7, and thus, the engagement pieces 30 are disengaged from the ratchet 10.

Next, referring again to FIG. 1, the holding member 70 will be described. The holding member 70 is formed by punching out a ring-shaped hole in a thin steel plate. Further, a half-blanking process is performed on the holding member 70 in the axial direction. As a result, the holding member 70 has a cylindrical shape, and a first flange 71 and a second flange 72 are formed in a stepwise manner at one end of the holding member 70 in the axial direction (at a right end of the holding member 70 in the axial direction in FIG. 1). Each of the first flange 71 and the second flange 72 faces in the axial direction. As shown in FIG. 5, when the ratchet 10 is placed in the cylindrical holding member 70, the first flange 71 faces the outer surface of the cylindrical portion 12 of the ratchet 10 in the axial direction.

When the guide 20 is placed in the cylindrical holding member 70, the second flange 72 is in surface contact with the inner surface of the cylindrical portion 22 of the guide 20. A cylindrical portion protrudes from an outer peripheral edge of the second flange 72 in the axial direction. A bending portion 73 is provided at an end of the cylindrical portion. After the ratchet 10 and the guide 20 are placed in the holding member 70, the bending portion 73 is bent inwardly in the radial direction, that is, the bending portion 73 is crimped.

Accordingly, when the ratchet 10 is inserted in the cylindrical holding member 70 with the above-described configuration, the ratchet 10 is positioned with respect to the holding member 70 at a location in the axial direction, at which the outer surface of the cylindrical portion 12 is in point contact with projections 71a that project from an inner surface of the first flange 71. Thus, the ratchet 10 is placed in the holding member 70 in a manner such that the outer peripheral edge of the cylindrical portion 12 is surrounded by a cylindrical portion that connects the first flange 71 to the second flange 72 of the holding member 70.

Then, when the guide 20 is placed in the cylindrical holding member 70, the guide 20 is positioned with respect to the holding member 70 at a location in the axial direction, at which the inner surface of the cylindrical portion 22 is in surface contact with the second flange 72.

After the ratchet 10 and the guide 20 are placed in the holding member 70, the end (i.e., the bending portion 73) of the cylindrical portion of the holding member 70, which protrudes toward the outer surface of the cylindrical portion 22 of the guide 20, is bent inwardly in the radial direction, that is, the bending portion 73 is crimped toward the outer surface of the cylindrical portion 22. As a result, the holding member 70 is integrally coupled to, and fixed to the guide 20. Thus, the ratchet 10 and the guide 20 are inserted in the holding member 70 in the axial direction in a manner such that the ratchet 10 and the guide 20 are prevented from separating from the holding member 70.

As shown in FIG. 5, the ratchet 10 is placed in the holding member 70 in a manner such that the engagement pieces 30, the slide cam 40, and the like are disposed between the ratchet 10 and the guide 20, and a slight gap is formed between the cylindrical portion 12 of the ratchet 10 and the disc portion 21 of the guide 20 in the axial direction, and a slight gap is formed between the cylindrical portion 12 of the ratchet 10 and the first flange 71 of the holding member 70 in the axial direction. This avoids the situation where sliding friction between the ratchet 10 and the holding member 70 interferes with the rotation of the ratchet 10 relative to the guide 20. Thus, the ratchet 10 is smoothly rotated relative to the guide 20.

Referring again to FIG. 6, the guide walls 21a and 21b support the engagement piece 30 from both sides of the engagement piece 30 in the circumferential direction when the outer peripheral tooth surfaces 30a are engaged with the respective inner peripheral tooth surfaces 12a, the guide walls 21c and 21d support the engagement piece 30 from both sides of the engagement piece 30 in the circumferential direction when the outer peripheral tooth surfaces 30a are engaged with the respective inner peripheral tooth surfaces 12a. Guide surfaces fa to fd of the guide walls 21a to 21d extend straight in the radial direction in which the outer peripheral teeth surfaces 30a of the engagement pieces 30 are engaged with the respective inner peripheral tooth surfaces 12a of the ratchet 10. Thus, the guide surface fa and the guide surface fb, which support the upper engagement piece 30 in FIG. 6, are disposed in parallel with each other to face each other. The guide surface fc and the guide surface fd, which support the lower engagement piece 30 in FIG. 6, are disposed in parallel with each other to face each other.

When the outer peripheral tooth surface 30a of the upper engagement piece 30 in FIG. 6 is oriented to engage with the corresponding inner peripheral tooth surface 12a of the ratchet 10 in the radial direction (i.e., when the reclining device 4 is in the lock state as shown in FIG. 6), side surfaces 30b of the upper engagement piece 30 in FIG. 6 extend in a direction inclined in the circumferential direction with respect to the radial direction in which the outer peripheral tooth surface 30a is engaged with the corresponding inner peripheral tooth surface 12a, and the side surfaces 30b of the upper engagement piece 30 extend in parallel with each other. Also, the side surfaces 30b of the lower engagement piece 30 in FIG. 6 extend in a direction inclined in the circumferential direction with respect to the radial direction in which the outer peripheral surface 30a is engaged with the corresponding inner peripheral tooth surface 12a, and the side surfaces 30b of the lower engagement piece 30 extend in parallel with each other, as well as the side surfaces 30b of the upper engagement piece 30. However, the side surfaces 30b of the lower engagement piece 30 are inclined in the circumferential direction opposite to the circumferential direction in which the side surfaces 30b of the upper engagement piece 30 are inclined.

Figure 10:
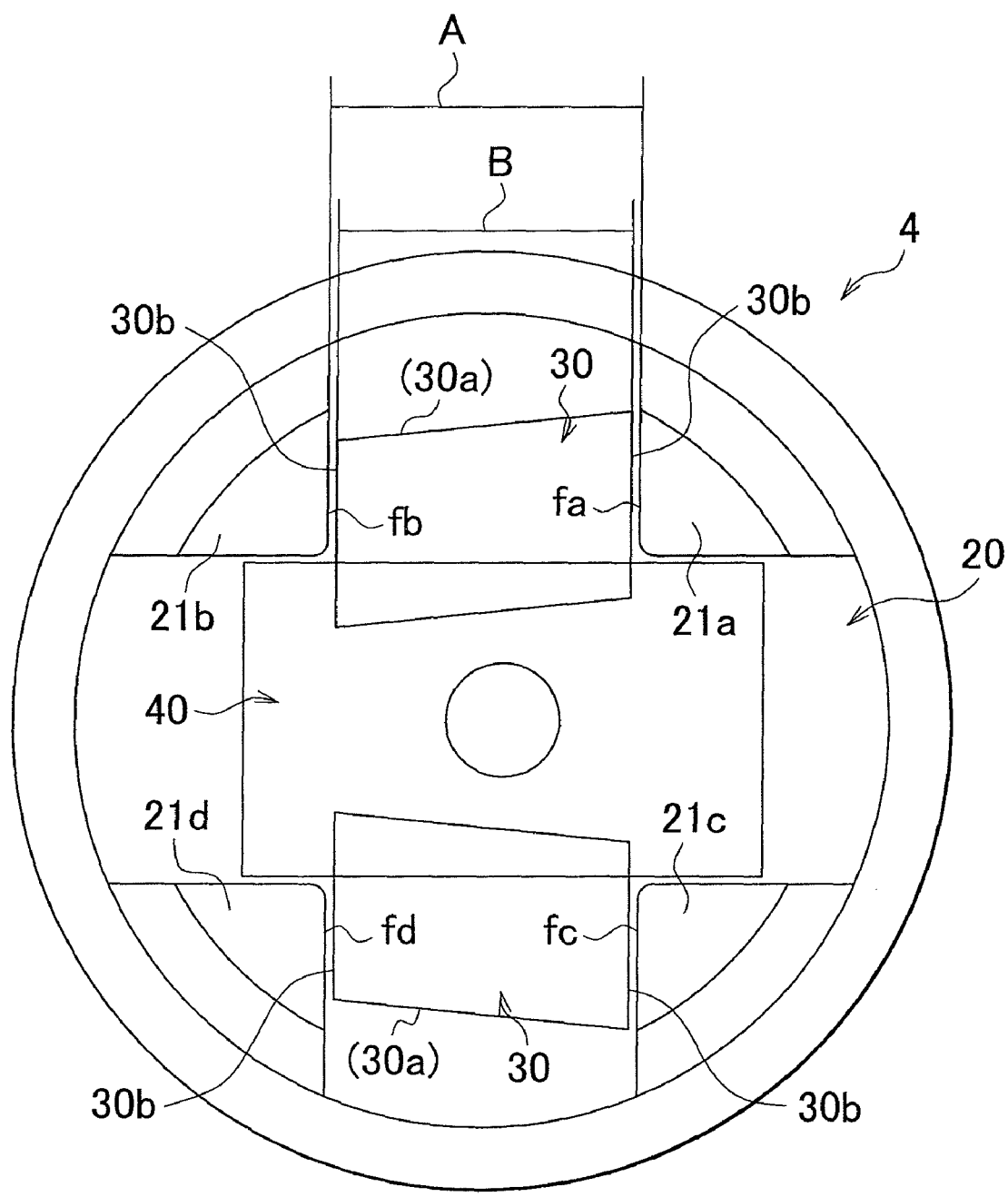
FIG. 10 is a schematic diagram showing a relation between a length between side surfaces of each engagement piece and a length between guide walls.
Figure 11:
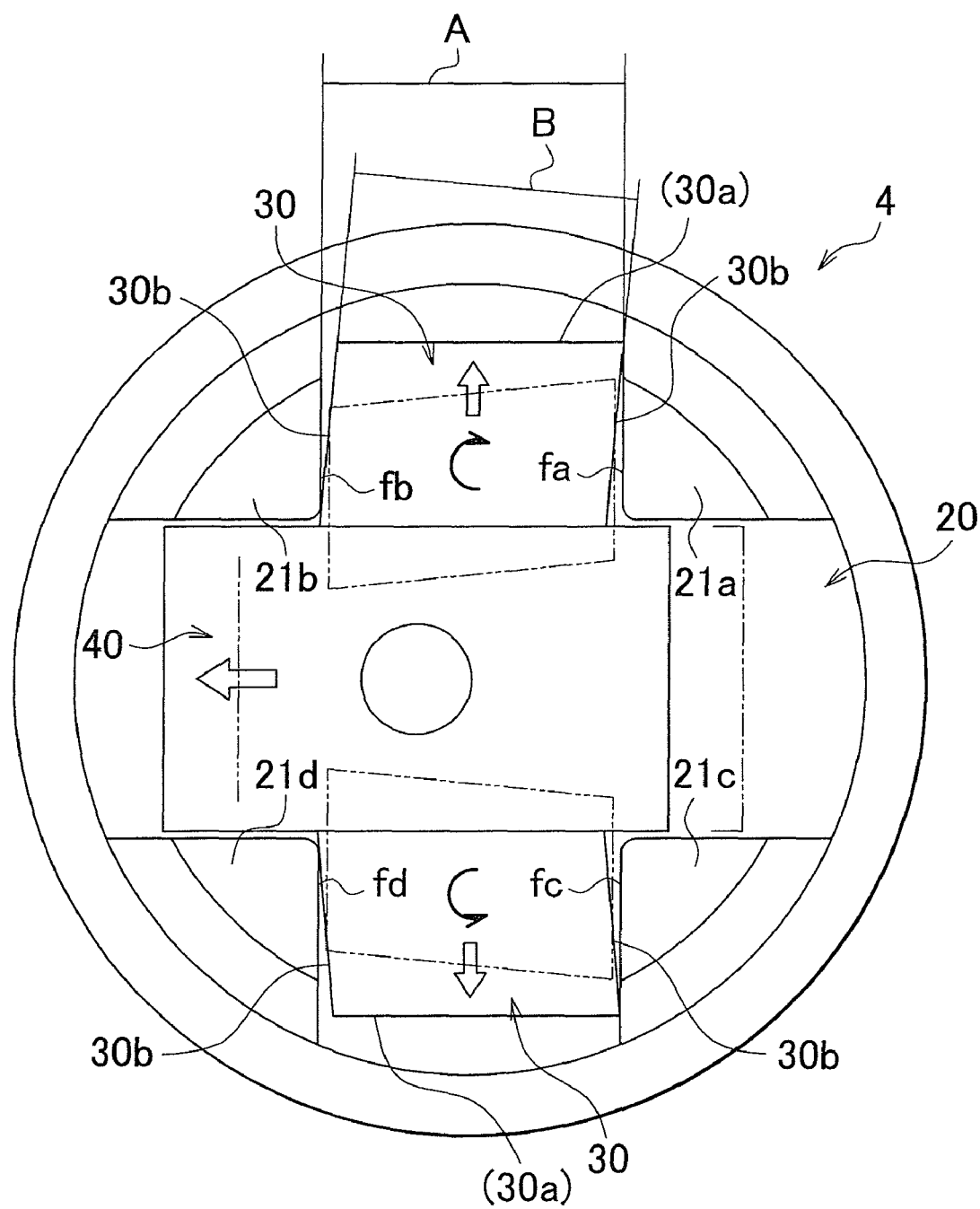
FIG. 11 is a schematic diagram showing the reclining device that is brought from the state shown in FIG. 10 to a state in which engagement pieces are caused to contact guide walls of a guide by a locking operation.

FIG. 11 schematically shows a relation between a length between the side surfaces 30b of each engagement piece 30 and a length between the guide walls 21a and 21b (21c and 21d) when the outer peripheral tooth surfaces 30a are engaged with the respective inner peripheral tooth surface 12a as shown in FIG. 6. FIG. 10 schematically shows the relation between the length between the side surfaces 30b of each engagement piece 30 and the length between the guide walls 21a and 21b (21c and 21d) when the outer peripheral tooth surfaces 30a are disengaged from the respective inner peripheral tooth surface 12a as shown in FIG. 7. In FIG. 10 and FIG. 11, the relation between the length between the side surfaces 30b of each engagement piece 30 and the length between the guide walls 21a and 21b (21c and 21d) is more exaggerated than the actual relation, to show the relation in an easy-to-understand manner.

As shown in FIG. 10 and FIG. 11, the length B between the side surfaces 30b of the upper disengagement piece 30 is set to be smaller than the length A between the guide surfaces fa and fb. Therefore, before the outer peripheral tooth portion 30a of the upper engagement piece 30 is engaged with the corresponding inner peripheral tooth portion 12a of the ratchet 10 (refer to FIG. 10), the side surfaces 30b of the upper engagement piece 30 extend in parallel with the guide surfaces fa and fb. Further, a gap is formed between the side surface 30b and the guide surface fa in the circumferential direction, and a gap is formed between the other side surface 30b and the guide surface fb in the circumferential direction.

Similarly, the length B between the side surfaces 30b of the lower engagement pieces 30 is set to be smaller than the length A between the guide surfaces fc and fd. Therefore, before the outer peripheral tooth portion 30a of the lower engagement piece 30 is engaged with the corresponding inner peripheral tooth portion 12a of the ratchet 10 (refer to FIG. 10), the side surfaces 30b of the lower engagement piece 30 extend in parallel with the guide surfaces fc and fd. Further, a gap is formed between the side surface 30b and the guide surface fc in the circumferential direction, and a gap is formed between the other side surface 30b and the guide surface fd in the circumferential direction.

As shown in FIG. 11, as the slide cam 40 slides toward the left side in FIG. 11, the engagement pieces 30 are pushed outwardly in the radial direction, while being rotated in the rotational directions opposite to each other. Thus, when the outer peripheral tooth portions 30a of the engagement pieces 30 are engaged with the respective inner peripheral tooth portion 12a of the ratchet 10, the engagement pieces 30 are held in a manner such that the side surfaces 30b of the upper engagement piece 30 contact the guide surfaces fa and fb, and the side surfaces 30b of the lower engagement piece 30 contact the guide surfaces fc and fd.

Thus, when the outer peripheral tooth portions 30a of the engagement pieces 30 are engaged with the respective inner peripheral tooth portions 12a of the ratchet 10, the engagement pieces 30 are held in a manner such that the engagement pieces 30 contact the guide surfaces fa and fb, and the guide surfaces fc and fd in the circumferential direction. Therefore, as shown in FIG. 6, even when a rotational force in the clockwise direction or the counterclockwise direction is input to the ratchet 10, the engagement pieces 30 are stably supported without vibrating in the circumferential direction. Accordingly, as shown in FIG. 11, when the upper engagement piece 30 is rotated in the clockwise direction so that the outer peripheral tooth portion 30a of the upper engagement piece 30 is engaged with the corresponding inner peripheral tooth portion 12a of the ratchet 10, the right side surface 30b of the upper engagement piece 30 contacts the guide surface fa at a position close to the outer peripheral tooth surface 30a.

Accordingly, as shown in FIG. 6, even when the rotational force in the clockwise direction is input to the ratchet 10, the right side surface 30b is supported by the guide surface fa at a position close to a right end of the outer peripheral tooth surface 30a that is engaged with the corresponding inner peripheral tooth surface 12a of the ratchet 10. Therefore, the guide surface fa stably receives the rotational force in the clockwise direction applied to the ratchet 10.

However, the left side surface 30b of the upper engagement piece 30 contacts the guide surface fb at a position inside the outer peripheral tooth surface 30a in the radial direction, and far from the outer peripheral tooth surface 30a in the radial direction. Therefore, as shown in FIG. 6, when the rotational force in the counterclockwise direction is input to the ratchet 10, the upper engagement piece 30 is likely to be pushed in the direction in which the rotational force is applied, due to the gap between the left side surface 30b and the guide surface fb.

However, in contrast, the lower engagement piece 30 is rotated in the direction opposite to the direction in which the upper engagement piece 30 is rotated, and the right side surface 30b of the lower engagement piece 30 contacts the guide surface fc at a position close to the outer peripheral tooth surface 30. Accordingly, when the rotational force in the counterclockwise direction is input to the ratchet 10, the guide surface fc stably receives the rotational force in the counterclockwise direction that is applied to the ratchet 10.

Figure 9:
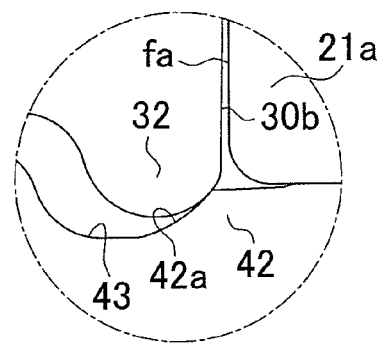
FIG. 9 is an enlarged partial view of FIG. 8.

When the slide cam 40 is slid, the engagement pieces 30 are rotated in the directions opposite to each other while being pushed outwardly in the radial direction, because inclined surfaces 42a of the right shoulder portions 42 of the slide cam 40 in FIG. 8 and FIG. 9 push the right leg portions 32 of the engagement pieces 30 in an oblique direction with respect to the direction in which the slide cam 40 is slid.

Thus, in the reclining device according to the embodiment, one engagement piece 30 is rotated in the direction opposite to the direction in which the other engagement piece 30 is rotated, and the one engagement piece 30 contacts the guide surfaces fa and fb, and the other engagement piece 30 contacts the guide surfaces fc and fd. Therefore, the supporting force for supporting the engagement pieces 30 in the clockwise direction and the supporting force for supporting the engagement pieces 30 in the counterclockwise direction are stably provided. Accordingly, although the engagement pieces 30 are easily placed in the guide 20 in a manner such that the gap is formed between the engagement piece 30 and each of the guide surfaces fa and fb, and the gap is formed between the other engagement piece 30 and each of the guide surfaces fc and fd, the engagement pieces 30 contact the guide surfaces fa and fb, and the guide surfaces fc and fd in the circumferential direction to prevent the engagement pieces 30 from vibrating, when the reclining device 4 is in the lock state.

Also, when the outer peripheral tooth surfaces 30a of the engagement pieces 30 are engaged with the respective inner peripheral tooth surfaces 12a of the ratchet 10, the side surfaces 30b of the upper engagement piece 30 and the side surfaces 30b of the lower engagement piece 30 are inclined with respect to the direction in which the outer peripheral tooth surfaces 30a of the engagement pieces 30 are engaged with the respective inner peripheral tooth surfaces 12a of the ratchet 10. Therefore, the outer peripheral tooth surfaces 30a face outwardly in the radial direction when the engagement pieces 30 are rotated so that the outer peripheral tooth surfaces 30a are engaged with the respective inner peripheral tooth surfaces 12a of the ratchet 10, and the engagement pieces 30 contact the guide surfaces fa and fb, and the guide surfaces fc and fd. Thus, it is possible to make peripheral lengths of the outer peripheral tooth surfaces 30a long. In other words, when the outer peripheral tooth surfaces 30a are disengaged from the respective inner peripheral tooth surfaces 12a, the outer peripheral tooth surfaces 30a are inclined with respect to the respective inner peripheral tooth surfaces 12a. Thus, it is possible to make the peripheral lengths of the outer peripheral tooth surfaces 30a long.

Figure 12:
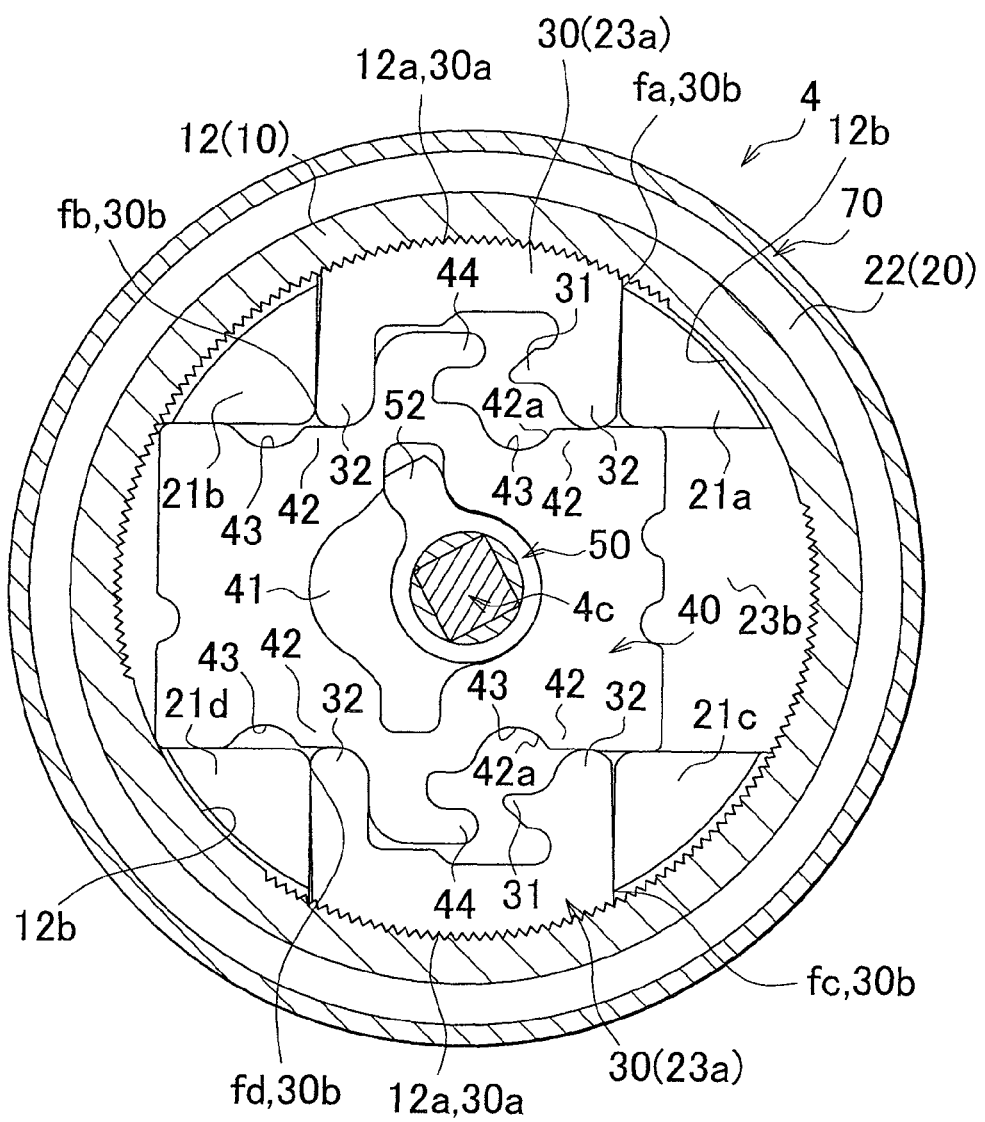
Figure 13:
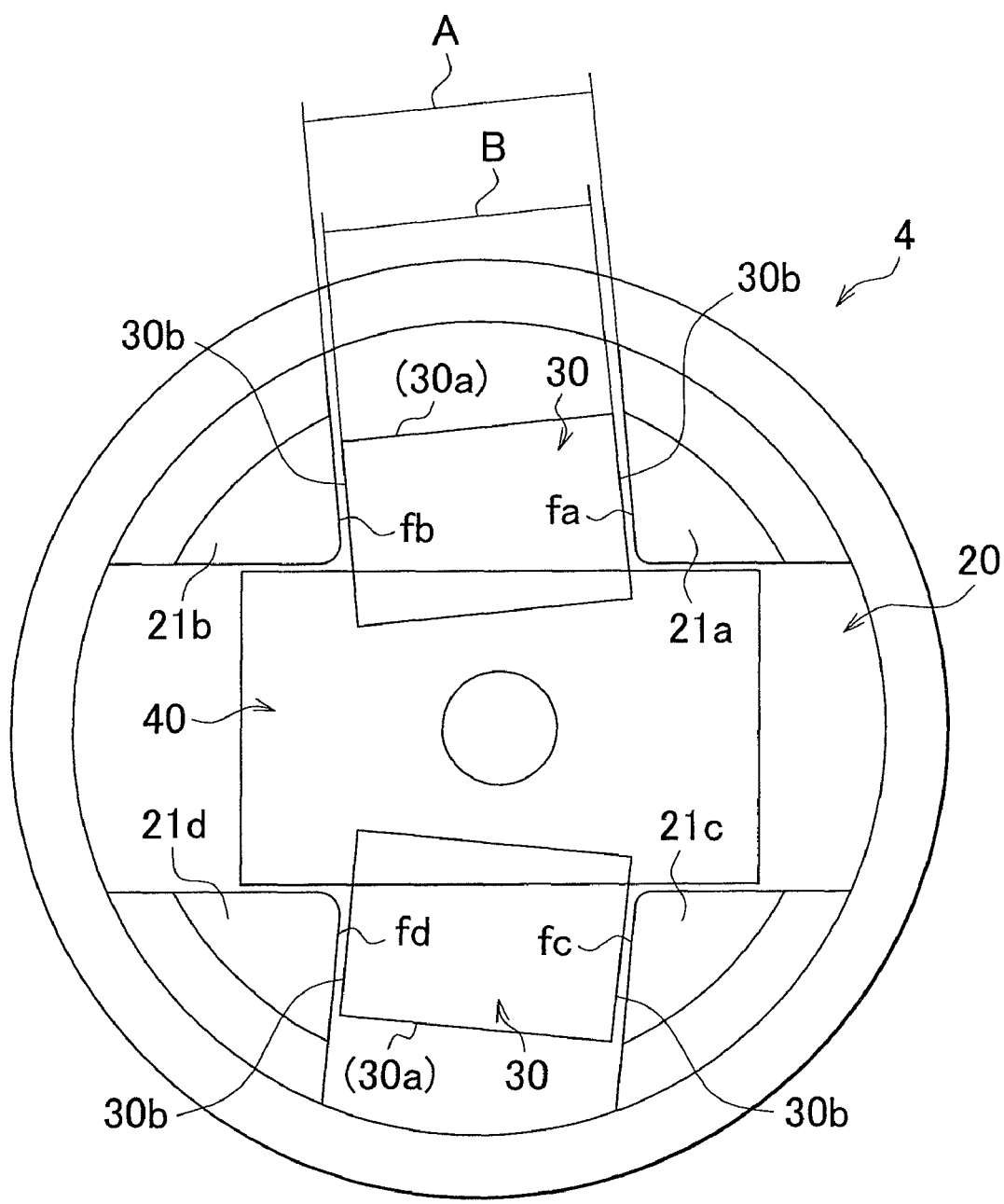
FIG. 13 is a schematic diagram showing a relation between a length between the side surfaces of each engagement piece and a length between the guide walls of the guide.
Figure 14:
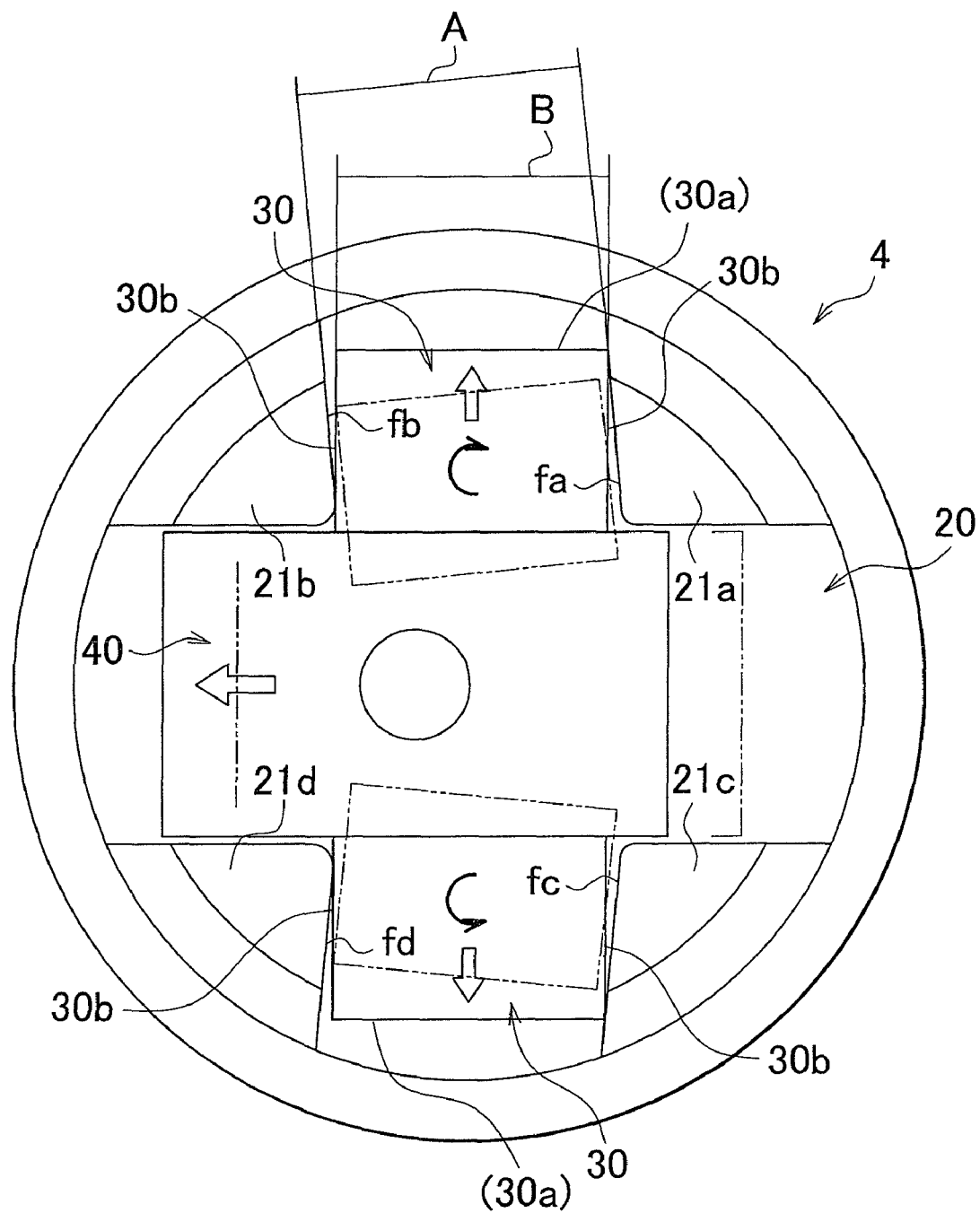
FIG. 14 is a schematic diagram showing the reclining device that is brought from the state shown in FIG. 13 to a state in which the engagement pieces are caused to contact the guide walls by the locking operation.

Next, a configuration of a coupling device (reclining device 4) of a vehicle seat according to a second embodiment will be described with reference to FIG. 12 to FIG. 14. In FIG. 12 to FIG. 14, portions of the reclining device 4, which have the substantially same configurations or effects as those of the portions of the reclining device 4 in the first embodiment, will be denoted by the same reference numerals, and the description thereof will be omitted. Portions of the reclining devices 4, which are different from those in the first embodiment, will be described in detail.

In the reclining device 4 according to the second embodiment, as shown in FIG. 12, when the outer peripheral tooth surfaces 30a of the engagement pieces 30 are engaged with the respective inner peripheral tooth surfaces 12a of the ratchet 10, the side surfaces 30b of the upper engagement pieces 30 and the side surfaces 30b of the lower engagement pieces 30 extend straight in parallel with each other, and extend in the radial direction in which the outer peripheral tooth surfaces 30a are engaged with the respective inner peripheral tooth surfaces 12a. When the outer peripheral tooth surfaces 30a are engaged with the respective inner peripheral tooth surfaces 12a, the guide surfaces fa and fb support the upper engagement piece 30 from both sides of the engagement piece 30 in the circumferential direction. The guide surfaces fa and fb extend in parallel with each other, and extend in a direction inclined in the circumferential direction with respect to the radial direction in which the outer peripheral tooth surface 30a of the upper engagement piece 30 is engaged with the corresponding inner peripheral tooth surface 12a of the ratchet 10. When the outer peripheral tooth surfaces 30a are engaged with the respective inner peripheral tooth surfaces 12a, the guide surfaces fc and fd support the lower engagement piece 30 from both sides of the engagement piece 30 in the circumferential direction. The guide surfaces fc and fd extend in parallel with each other, and extend in a direction inclined in the circumferential direction with respect to the radial direction in which the outer peripheral tooth surface 30a of the lower engagement piece 30 is engaged with the corresponding inner peripheral tooth surface 12a of the ratchet 10.

The guide surfaces fc and fd are inclined in the circumferential direction opposite to the circumferential direction in which the guide surfaces fa and fb are inclined. FIG. 14 schematically shows a relation between a length between the side surfaces 30b of each engagement piece 30 and a length between the guide walls 21a and 21b (21c and 21d) when the outer peripheral tooth surfaces 30a of the engagement pieces 30 are engaged with the respective inner peripheral tooth surface 12a of the ratchet 10. FIG. 13 schematically shows the relation between the length between the side surfaces 30b of each engagement piece 30 and the length between the guide walls 21a and 21b (21c and 21d) when the outer peripheral tooth surfaces 30a of the engagement pieces 30 are disengaged from the respective inner peripheral tooth surface 12a of the ratchet 10. In FIG. 13 and FIG. 14, the relation between the length between the side surfaces 30b of each engagement piece 30 and the length between the guide walls 21a and 21b (21c and 21d) is more exaggerated than the actual relation, to show the relation in an easy-to-understand manner.

As shown in FIG. 13 and FIG. 14, the length B between the side surfaces 30b of the upper disengagement piece 30 is set to be smaller than the length A between the guide surfaces fa and fb. Therefore, before the outer peripheral tooth portion 30a of the upper engagement piece 30 is engaged with the corresponding inner peripheral tooth portion 12a of the ratchet 10 (refer to FIG. 13), the side surfaces 30b of the upper engagement piece 30 extend in parallel with the guide surfaces fa and fb. Further, a gap is formed between the side surface 30b and the guide surface fa in the circumferential direction, and a gap is formed between the other side surface 30b and the guide surface fb in the circumferential direction.

Similarly, the length B between the side surfaces 30b of the lower engagement pieces 30 is set to be smaller than the length A between the guide surfaces fc and fd. Therefore, before the outer peripheral tooth portion 30a of the lower engagement piece 30 is engaged with the corresponding inner peripheral tooth portion 12a of the ratchet 10 (refer to FIG. 13), the side surfaces 30b of the lower engagement piece 30 extend in parallel with the guide surfaces fc and fd. Further, a gap is formed between the side surface 30b and the guide surface fc in the circumferential direction, and a gap is formed between the other side surface 30b and the guide surface fd in the circumferential direction.

As shown in FIG. 14, when the slide cam 40 is slid toward the left side in FIG. 14, the engagement pieces 30 are pushed outwardly in the radial direction while being rotated in the rotational directions opposite to each other. As a result, when the outer peripheral tooth surfaces 30a are engaged with the respective inner peripheral tooth surfaces 12a, the engagement pieces 30 are held in a manner such that the side surfaces 30b of the upper engagement piece 30 contact the guide surfaces fa and fb, and the side surfaces 30b of the lower engagement piece 20 contact the guide surfaces fc and fd.

Thus, the guide surfaces fa and fb, and the guide surfaces fc and fd are inclined with respect to the direction in which the outer peripheral tooth surfaces 30a are engaged with the respective inner peripheral tooth surfaces 12a of the ratchet 10. The side surfaces 30b of the engagement pieces 30 are formed to extend straight in parallel with the direction in which the outer peripheral tooth surfaces 30a are engaged with the respective inner peripheral tooth surfaces 12a when the outer peripheral tooth surfaces 30a are engaged with the respective inner peripheral tooth surfaces 12a. Accordingly, when the engagement pieces 30 are rotated to contact the corresponding guide surfaces, the outer peripheral tooth surfaces 30a are oriented to engage with the respective inner peripheral tooth surfaces 12a.

Although the invention has been described using the first and second embodiments, the invention may be implemented in other various embodiments. For example, in the above-described embodiments, the coupling device of a vehicle seat according to the invention is employed as the reclining device 4 that couples the seat back 2 to the seat cushion 3 in a manner such that the tilt angle of the seat back 2 is adjustable. However, the coupling device may be used to couple a tilting seat back to a floor of a vehicle body.

Also, the coupling device may be used to couple a seat body to the floor of the vehicle body in a manner such that the seat body is turned in a turning direction. Also, the coupling device may be used to couple a so-called ottoman device, which lifts legs of an occupant from below, and supports the legs, to the seat cushion or the floor of the vehicle body in a manner such that the ottoman device is tiltable.

In the reclining device 4, the two engagement pieces 30 are simultaneously moved in the radial direction by the slide cam 40. However, for example, a rotary cam that simultaneously moves three or more engagement pieces as described in Japanese Patent Application Publication No. 2005-312891 (JP-A-2005-312891) may be used. Also, three or more engagement pieces may be arranged in the guide using the rotary cam.

In each of the above-described embodiments, the side surfaces of the engagement piece or the guide surfaces extend in parallel with the radial direction. However, the side surfaces of the engagement piece or the guide surfaces need not nec-essarily extend in parallel with the radial direction. As long as the both side surfaces of the engagement piece or a pair of the guide surfaces extend in parallel with each other, it is possible to obtain the same advantageous effects.

What is claimed is:

1. A coupling device of a vehicle seat, which couples two subject members in a manner such that one of the two subject members is rotated relative to the other of the two subject members, and relative rotation of the two subject members is locked at a given position, comprising:

a first coupling member and a second coupling member, each of which includes a disc portion, wherein the first coupling member and the second coupling member are integrally coupled to the respective subject members, and the first coupling member is combined with the second coupling member in a manner such that the first coupling member and the second coupling member are rotated relative to each other, and the disc portions of the first coupling member and the second coupling member face each other;

at least two lock members disposed between the first coupling member and the second coupling member, wherein, when outer peripheral tooth surfaces formed in the lock members are engaged with respective inner peripheral tooth surfaces formed in the second coupling member, relative rotation of the first coupling member and the second coupling member is locked;

a plurality of pairs of guide portions formed in the first coupling member, wherein side surfaces of each pair of guide portions are disposed on sides of the corresponding lock member in a circumferential direction, wherein:

each of the lock members is placed in the first coupling member so that a gap is formed between the lock member and each of the corresponding pair of the guide portions disposed on the sides of the lock member;

when the outer peripheral tooth surface of each of the lock members is engaged with the corresponding inner peripheral tooth surface of the second coupling member, the lock member is rotated so that the lock member is inclined with respect to the side surfaces of the corresponding pair of the guide portions, and a portion of each of both side surfaces of the lock member contacts the side surface of the corresponding guide portion; and the lock members are arranged in the circumferential direction in the first coupling member, and at least one of the lock members is rotated in a rotational direction opposite to a direction in which at least one of the other lock members is rotated, to contact the side surfaces of the corresponding pair of the guide portions; and a slide cam disposed between the two lock members, the slide cam including inclination surfaces formed therein;

wherein:

the two lock members are symmetric to each other with respect to a line orthogonal to a rotational axis of the coupling device;

when the slide cam slides in one direction along the line, the two lock members are guided by respective inclination surfaces formed in the slide cam so that the two lock members are rotated in the rotational directions opposite to each other while the two lock members are pushed outwardly in a radial direction of the first coupling member.

2. The coupling device according to claim 1, wherein:

shoulder portions and hook portions are formed in the slide cam, the shoulder portions push the respective lock members outwardly in the radial direction, and the hook portions pull the respective lock members inwardly in the radial direction; and when the slide cam slides in the one direction, a portion of each of the lock members is placed on the corresponding shoulder portion so that the lock member is pushed outwardly in the radial direction, and when the slide cam slides in a direction opposite to the one direction, each of the lock members is hooked by the corresponding hook portion, and pulled inwardly in the radial direction.

3. The coupling device according to claim 1, wherein:

the side surfaces of each pair of the guide portions extend straight in parallel with each other;

the side surfaces of each of the lock members are inclined with respect to the side surfaces of the corresponding pair of the guide portions, and extend in parallel with each other, when the outer peripheral tooth surfaces formed in the lock members are engaged with the respective inner peripheral tooth surfaces of the second coupling member; and when each of the lock members is oriented so that the side surfaces of the lock member extend in parallel with the side surfaces of the corresponding pair of the guide portions, a gap is formed between the lock member and each of the side surfaces of the corresponding pair of the guide portions in the circumferential direction.

4. The coupling device according to claim 3, wherein the side surfaces of each pair of the guide portions extend in substantially parallel with the radial direction of the first coupling member.

5. The coupling device according to claim 3, wherein the side surfaces of each of the lock members extend in substantially parallel with the radial direction of the first coupling member when the outer peripheral tooth surfaces formed in the lock members are engaged with the respective inner peripheral tooth surfaces of the second coupling member.

* * * * *